May 28, 1963  M. HAMMAR  3,091,699
PHOTOELECTRIC DEVICE FOR INDICATING SPOTS ON A SURFACE
Filed Aug. 31, 1960
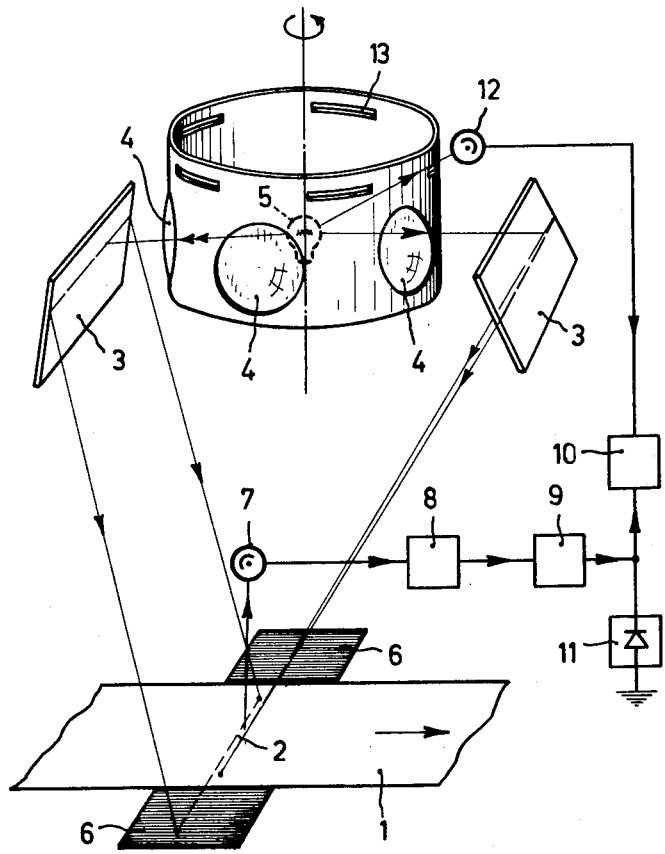
INVENTOR
*MARTIN HAMMER*
BY
AGENT

United States Patent Office 3,091,699
Patented May 28, 1963

3,091,699
PHOTOELECTRIC DEVICE FOR INDICATING SPOTS ON A SURFACE
Martin Hammar, Solna, Sweden, assignor to North American Philips Company, Inc., New York, N.Y., a corporation of Delaware
Filed Aug. 31, 1960, Ser. No. 53,139
Claims priority, application Sweden Oct. 15, 1959
7 Claims. (Cl. 250—219)

The present invention relates to devices for indicating spots and the like on a surface including a light source for lighting the surface, a light-sensitive member for generating an electrical signal with a strength depending upon the intensity of the light reflected from the surface, means for effecting a point-shaped reciprocating scanning across the surface in its crossdirection and means for effecting a relative movement between the surface and the scanning point in the longitudinal direction of the surface.

In such devices there is a difficulty due to the fact that, if the scanning point is permitted to fall on any of the boundary lines of the surface, an indication is obtained, which can not be distinguished from an indication corresponding to an encountered spot or the like situated near the boundary lines of the surface.

A possibility to avoid such undesirable indications consists in permitting the scanning point only to touch the side edges of the surface. This is however difficult to realize especially if the scanning takes place over a surface in the shape of a band, which passes the device and where the positions of the side edges can not be fixed exactly, or over surfaces in the shape of rectangular or quadratic plates, where also the front- and back-edges of the plates give rise to undesirable indications.

In a device according to the present invention the mentioned difficulties are overcome in a simple way by the scanning in each of the both opposite directions being arranged to start on the surface and to end outside the side edges of the surface and the scanning outside the side edges of the surface being arranged to take place against a background, which, when indicating dark spots, has greater reflection power than the surface and for instance is white, and when indicating light spots, has less reflection power than the surface and for instance is black and by the signal generated by the light-sensitive member being arranged to be fed to an indicating member via a differentiating member, the indicating member being arranged only to be actuated by or fed with pulses of the polarity, which is opposite to the polarity of the pulses generated by the differentiating member when the scanning point passes a side edge.

For indication only pulses are thus utilized, which are generated by the differentiating member, when the scanning point reaches parts of the surface, which have deviating reflection power or colour. At front- and back-edges of plates the change of reflection power takes place relatively slowly, and therefore the generated pulses are small and can easily be prevented from actuating the indicating member.

The sensitivity of the device depends upon how large a part of the scanning point a spot or a part with deviating reflection power represents. According to an embodiment of the invention the device is therefore provided with means for adjusting the size of the scanning point to a value corresponding to the desired sensitivity of the scanning.

The invention will be more clearly described below in connection with the annexed drawing, which schematically shows as an example an embodiment of the invention.

A surface in the shape of a band, which passes the device, is designated 1. On the surface a point-shaped light spot 2 is projected by means of two mirrors 3 and an annular system of lenses 4, rotating around a light source 5 arranged in the centre of the circle. The lenses 4, which are arranged equally distributed and constitute and odd number, produce a corresponding number of radially directed, rotating light beams. The mirrors 3 are diametrically arranged and are alternately swept over by light beams, which are reflected towards the surface 1 and a background plate 6 and produce a reciprocating light point. Light reflected from the surface 1 and the background plate 6 is detected by means of a photocell device 7 arranged above the surface 1. This generates a signal with a size depending of the reflected light intensity, which is fed to an indicating member 10 through a differentiating member 8 and an amplifier 9 containing a number of amplifying tubes with the usual coupling networks.

The indicating device 10 may be a tube provided with two grids (not shown), one for blocking for a time determined by the length of the slit 13 and the second grid to which the pulse is supplied. The anode contains a suitable indication of the pulse (not shown). The differentiating member 8 can be constituted by a series resistance and a parallel capacitor.

If it for the sake of simplicity is assumed, that the device shall indicate white spots on a grey surface, the background plate 6 shall, as has been previously mentioned, be black-coloured and the mode of operation of the device is then the following.

The scanning point begins its movement on the grey surface 1. When hitting a white spot the differentiating member 8 generates a positive pulse, which is amplified and fed to the indicating member 10. When the scanning point during its continued movement goes from the white spot to the grey surface the member 8 generates a negative pulse, which by means of a rectifier device 11 is suppressed. In the same way a negative pulse is generated when the scanning point at the edge line of the surface goes from the grey surface 1 to the black background plate 6.

As has previously been mentioned the scanning in the opposite direction shall begin on the surface 1. During the movement of the scanning point in this direction from the turning point of the background plate 6 until it has come onto the surface 1 the indicating member 11 will therefore be blocked by means of a blocking voltage, which is generated by means of a lightsensitive member 12, which during this movement is lighted by the light source 5 through a perforation 13 suitably arranged in the circle-shaped socket of the lens system 4. The indicating member 10 is for this purpose provided with a gas-filled tube with a first control grid connected with the amplifying member 9 and with a second control grid connected with the said light-sensitive member 12 generating a blocking voltage. The light sensitive member 12 can be connected in series with a resistor and a voltage source, the resistor being included in the first grid circuit for blocking the indicator tube 10.

The invention is of course not restricted to the present embodiment and a great number of modifications are possible within the scope of the invention. Thus the photocell device 7 and the light source 5 may change places, whereby the lighted surface 1 will be scanned by the photocell device 7 point by point. Moreover the blocking voltage can be generated by means of a special masking disk rotating synchronously with the lens system. The light source 5 may naturally also be extinguished or be diaphragmed during the movement of the scanning point from a turning point onto the surface, but such an embodiment can give rise to disturbing vibrations of the signal generated by the photocell.

What is claimed is:

1. A device for indicating spots and the like on a surface to be scanned comprising a light source for lighting the surface, a light sensitive member for generating an electrical signal with a strength depending upon the intensity of the light reflected from the surface, a background surface behind said surface to be scanned, means for effecting a point-shaped reciprocating scanning light across the surface in opposite directions from the scanned surface to the background surface, each of said scannings being arranged to start on said scanning surface and terminating outside of the side edges of said surface, said scanning outside of said side edges being arranged to take place against a background which, when indicating dark spots, has greater reflection power than said scanning surface, and when indicating light spots, has less reflection power than said surface, an indicating member, a differentiating member, said electric signal being fed to said indicating member through said differentiating member and said indicating member is arranged to be actuated by pulses of a polarity which is opposite to the polarity of the pulses generated by said differentiating member when said scanning passes one of said side edges.

2. A device for indicating spots or the like on a surface to be scanned as claimed in claim 1 further comprising means for adjusting the size of said point-shaped reciprocating scanning light to a value corresponding to the desired sensitivity of said scanning light.

3. A device for indicating spots or the like on a surface to be scanned as claimed in claim 1 further including a gas filled tube in said indicating member having a first and second control grid, the output of said differentiating member being connected to said first control grid and a blocking voltage supplied to said second control grid during a predetermined movement of said scanning light.

4. A device for indicating spots and the like on a surface to be scanned comprising a light source for lighting the surface, a light sensitive member for generating an electrical signal with a strength depending upon the intensity of the light reflected from the surface, a background surface behind said surface to be scanned, means for effecting a point-shaped reciprocating scanning light across the surface in opposite directions from the scanned surface to the background surface, said means comprising said light source and a lens system, said lens system being arranged to rotate about said light source, two diametrically opposed mirrors located on opposite sides of said lens system whereby at least one light beam is generated to alternately sweep over said opposed mirrors and be reflected toward said scanning surface, each of said scannings being arranged to start on said scanning surface and terminating outside of the side edges of said surface, said scanning outside of said side edges being arranged to take place against a background which, when indicating dark spots, has greater reflection power than said scanning surface, and when indicating light spots, has less reflection power than said surface, an indicating member, a differentiating member, said electric signal being fed to said indicating member through said differentiating member and said indicating member is arranged to be actuated by pulses of a polarity which is opposite to the polarity of the pulses generated by said differentiating member when said scanning passes one of said side edges.

5. A device for indicating spots or the like on a surface to be scanned as claimed in claim 4 wherein said lens system is circularly shaped and is constituted of an odd number of lenses equally distributed about the periphery of said circle.

6. A device for indicating spots and the like on a surface to be scanned comprising a light source for lighting the surface, a light sensitive member for generating an electrical signal with a strength depending upon the intensity of the light reflected from the surface, a background surface behind said surface to be scanned, means for effecting a point-shaped reciprocating scanning light across the surface in opposite directions from the scanned surface to the background surface, said means comprising said light source and a lens system, said lens system being arranged to rotate about said light source, two diametrically opposed mirrors located on opposite sides of said lens system whereby at least one light beam is generated to alternately sweep over said opposed mirrors and be reflected toward said scanning surface, each of said scannings being arranged to start on said scanning surface and terminating outside of the side edges of said surface, said scanning outside of said side edges being arranged to take place against a background which, when indicating dark spots, has greater reflection power than said scanning surface, and when indicating light spots, has less reflection power than said surface, an indicating member, a differentiating member, said electric signal being fed to said indicating member through said differentiating member and said indicating member is arranged to be actuated by pulses of a polarity which is opposite to the polarity of the pulses generated by said differentiating member when said scanning passes one of said side edges, and means for generating a blocking voltage for said device comprising said light source and a light sensitive member, a masking disc being rotated synchronously with said lens system, said light source and said second light sensitive member being arranged on both sides of said masking disc.

7. A device for indicating spots and the like as claimed in claim 6 wherein said masking disc is constituted of the circular socket of said lens system having perforations arranged around the periphery thereof.

References Cited in the file of this patent
UNITED STATES PATENTS

| | | |
|---|---|---|
| 2,017,901 | Huffman | Oct. 22, 1935 |
| 2,414,566 | Thomas | Jan. 21, 1947 |